(12) United States Patent
Cope et al.

(10) Patent No.: US 8,577,731 B1
(45) Date of Patent: Nov. 5, 2013

(54) METHOD OF TRANSACTION PROCESSING TO SUPPORT PROXY FINANCIAL CARD

(75) Inventors: Warren B. Cope, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/250,611

(22) Filed: Sep. 30, 2011

(51) Int. Cl.
*G06Q 20/00* (2012.01)

(52) U.S. Cl.
USPC ............................................. 705/17; 705/52

(58) Field of Classification Search
USPC .................... 709/229; 705/14, 16, 41, 17, 18
See application file for complete search history.

(56) References Cited

U.S. PATENT DOCUMENTS

| | | | |
|---|---|---|---|
| 6,314,409 B2 | 11/2001 | Schneck et al. | |
| 6,490,601 B1 | 12/2002 | Markus et al. | |
| 6,732,919 B2* | 5/2004 | Macklin et al. | ............... 235/380 |
| 6,886,741 B1 | 5/2005 | Salveson | |
| 7,413,113 B1 | 8/2008 | Zhu | |
| 7,494,058 B2 | 2/2009 | Bonalle et al. | |
| 7,546,266 B2* | 6/2009 | Beirne et al. | ..................... 705/37 |
| 7,575,177 B2 | 8/2009 | Killian et al. | |
| 7,644,859 B1 | 1/2010 | Zhu | |
| 7,926,714 B1 | 4/2011 | Zhu | |
| 7,988,060 B2 | 8/2011 | Killian et al. | |
| 7,996,324 B2 | 8/2011 | Bishop et al. | |
| 8,123,128 B1 | 2/2012 | Zhu | |
| 8,401,904 B1 | 3/2013 | Simakov et al. | |
| 2003/0126094 A1 | 7/2003 | Fisher et al. | |
| 2004/0010462 A1 | 1/2004 | Moon et al. | |
| 2004/0218741 A1 | 11/2004 | Welton | |
| 2004/0260647 A1 | 12/2004 | Blinn et al. | |
| 2006/0237528 A1 | 10/2006 | Bishop et al. | |
| 2007/0055785 A1* | 3/2007 | Stevens | ........................ 709/229 |
| 2009/0182634 A1* | 7/2009 | Park et al. | ........................ 705/14 |
| 2011/0237296 A1 | 9/2011 | Coppinger | |
| 2012/0108296 A1 | 5/2012 | Coppinger | |
| 2012/0203701 A1 | 8/2012 | Ayuso de Paul | |

OTHER PUBLICATIONS

Andrew T. Ching, Fumiko Hayashi, Payment card rewards programs and consumer payment choice, Journal of Banking & Finance, vol. 34, Issue 8, Aug. 2010, pp. 1773-1787, ISSN 0378-4266, http://dx.doi.org/10.1016/j.jbankfin.2010.03.015.(http://www.sciencedirect.com/science/article/pii/S0378426610001196).*

Office Action dated Oct. 12, 2006; U.S. Appl. No. 10/901,630, filed Jul. 28, 2004.

Office Action dated Apr. 5, 2007; U.S. Appl. No. 10/901,630, filed Jul. 28, 2004.

Office Action dated Oct. 9, 2007; U.S. Appl. No. 10/901,630, filed Jul. 28, 2000.

Notice of Allowance dated Apr. 8, 2008; U.S. Appl. No. 10/901,630, filed Jul. 28, 2004.

Office Action dated Apr. 16, 2009; U.S. Appl. No. 12/172,813, filed Jul. 14, 2008.

(Continued)

*Primary Examiner* — Matthew Gart
*Assistant Examiner* — Rokib Masud

(57) ABSTRACT

A method of completing a financial transaction after a point-of-sale terminal initiates a payment request and sends financial transaction information includes receiving financial transaction information from a point-of-sale terminal, the financial transaction information being associated with a transaction and identifying an individual that initiated the transaction. The method further includes accessing a database to determine a rule set associated with the individual, applying the rule set to the financial transaction information, and selecting a financial issuer based on the applied rule set.

20 Claims, 7 Drawing Sheets

(56) References Cited

OTHER PUBLICATIONS

Notice of Allowance dated Sep. 9, 2009; U.S. Appl. No. 12/172,813, filed Jul. 14, 2008.
Office Action dated Aug. 20, 2010; U.S. Appl. No. 12/631,372, filed Dec. 4, 2009.
Notice of Allowance dated Dec. 14, 2010; U.S. Appl. No. 12/631,372, filed Dec. 4, 2009.
Office Action dated Jul. 7, 2011; U.S. Appl. No. 13/045,306, filed Mar. 10, 2010.
Notice of Allowance dated Oct. 27, 2011; U.S. Appl. No. 13/045,306, filed Mar. 10, 2010.
Cope, Warren B., et al., "Electronic Purchase Transaction Trust Infrastructure", filed May 29, 2012, U.S. Appl. No. 13/482,731.
FAIPP Pre-Interview Communication dated Nov. 20, 2012, U.S. Appl. No. 13/344,096, filed Jan. 5, 2012.
Bierbaum, Christopher J, et al., "Electronic Payment Using a Proxy Account No. Stored in a Secure Element," filed Jan. 5, 2012, U.S. Appl. No. 13/344,096.
FAIPP Office Action dated Jan. 31, 2013, U.S. Appl. No. 13/344,096, filed Jan. 5, 2012.
Notice of Allowance dated Jun. 11, 2013, U.S. Appl. No. 13/344,096, filed Jan. 5, 2012.

\* cited by examiner

METHOD OF TRANSACTION PROCESSING TO SUPPORT PROXY FINANCIAL CARD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Consumers may have a plurality of payment cards that they may use to complete payment for goods and/or services at a point-of-sale terminal. For example, a consumer may choose from a debit card, a first credit card, or a second credit card to use for completing a transaction payment. The selection of one payment method versus other alternative payment methods may be based on incentives provided by institutions sponsoring and/or managing the subject payment methods. The selection of one payment method versus other alternative payment methods may likewise be influenced by the consumer's knowledge of their account balances and other individualized considerations. The point-of-sale terminal may receive some indication from the consumer—by swiping a magnetic strip of a credit card, by near field communication between an electronic device belonging to the consumer and the point-of-sale terminal—identifying the subject payment vehicle. The point-of-sale terminal may take steps electronically to authenticate and complete the payment transaction with a sponsoring institution, for example presenting account number and/or additional authorization tokens as well as transaction related information to the issuer of the first credit card.

Keeping up with what payment method should be used may be complicated for an individual. For example, credit cards may be shared by a husband and wife, and only one spouse may be aware that the balance of a debit card account is very low and that a credit card should be used for purchasing. Alternatively, only one spouse may be aware of a special discount available for using one credit card for payment versus another credit card at a specific retail store. The one spouse may inform the other spouse, but because such check-out transactions are so common, the uncustomary payment completion may be forgotten when engaged in conversational banter with a checkout clerk.

SUMMARY

In one embodiment, a method of completing a financial transaction after a point-of-sale terminal initiates a payment request and sends financial transaction information includes receiving financial transaction information from a point-of-sale terminal, the financial transaction information being associated with a transaction and identifying an individual that initiated the transaction. The method further includes accessing a database to determine a rule set associated with the individual, applying the rule set to the financial transaction information, and selecting a financial issuer based on the applied rule set.

In another embodiment, a method of completing a transaction at a point of sale terminal in which a proxy financial card is used to access credit card information stored on a network server includes receiving financial transaction information from the proxy financial card at the point-of-sale terminal, the financial transaction information associated with a transaction and identifying an individual that initiated the transaction and sending the financial transaction information from the point-of-sale terminal to a trusted service manager. The method also includes sending the financial transaction information from the trusted service manager to a service provider to access a database to determine a rule set associated with the individual. The method also includes receiving an indication of a financial issuer selected based on the rule set from the service provider and sending the financial transaction information to the selected financial issuer. The method further includes receiving authorization for the transaction from the financial issuer at the trusted service manager and sending the authorization from the trusted service manager to the point-of-sale terminal to complete the transaction.

In yet another embodiment, a system for completing an electronic financial transaction after a point-of-sale terminal initiates a payment request by sending financial transaction information includes a processor configured to execute a rule engine, a database and a processor configured to execute an authentication engine. The rule engine is configured to receive financial transaction information that is associated with a transaction and identify an individual that initiated the transaction. The rule engine is also configured to access the database to determine a rule set associated with the individual, apply the rule set to the financial transaction information, and select a financial issuer based on the applied rule set. The authentication engine is configured to receive information about the location of the point-of-sale terminal and receive information about the location of a portable electronic device associated to the individual that initiated the transaction. The authentication engine is further configured to compare the location of the point-of-sale terminal to the location of the portable electronic device associated to the individual that initiated the transaction and provide authentication based on the comparison of locations to the financial issuer selected by the rule engine.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
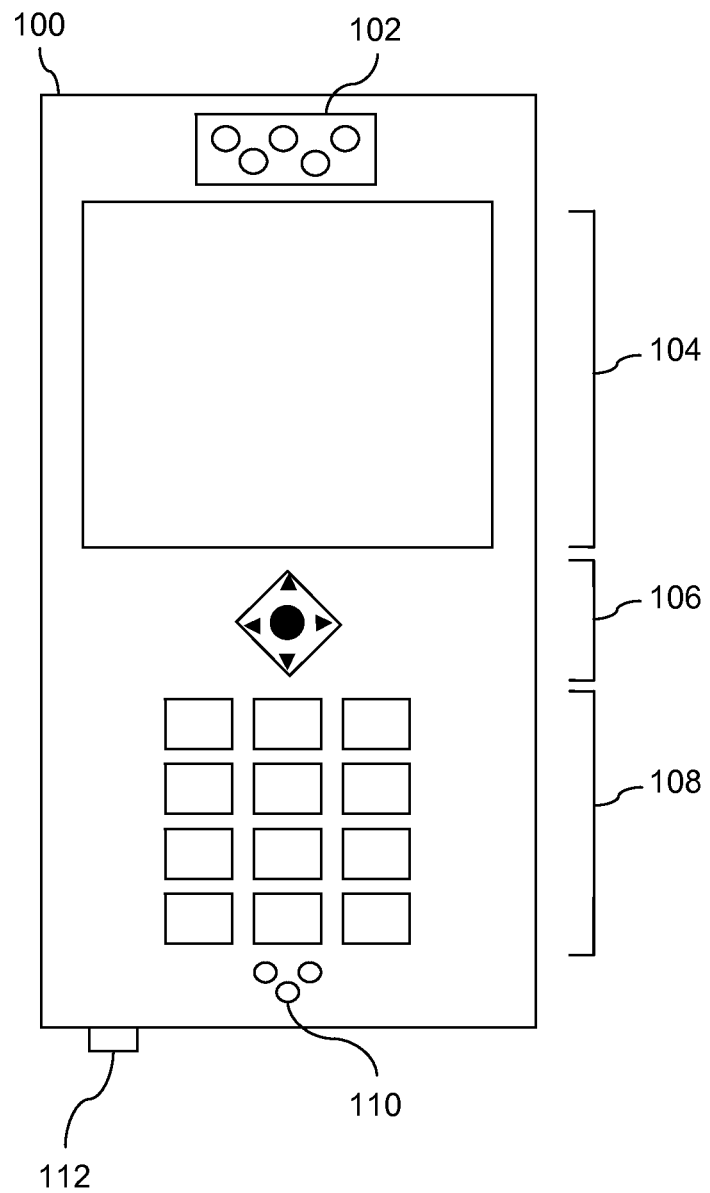
FIG. 1A illustrates a portable electronic device, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches several methods of facilitating a financial transaction initiated by a proxy financial card, detected using near-field communication ("NFC"). A proxy financial card is similar to a credit card, but unlike a credit card, which is associated with a single account with a financial issuer (e.g., VISA, AMEX, MASTERCARD), a proxy financial card is associated with the card-holder's accounts at a plurality of different financial issuers. Near field communication ("NFC"), is a set of short-range wireless technologies, typically requiring a distance of 4 cm or less. NFC involves an initiator and a target; the initiator actively generates an RF field that can power a passive target. This enables NFC targets to take very simple form factors such as tags, stickers, key fobs, or cards that do not require batteries.

In some embodiments, the proxy financial card is associated with the user's wireless communication service provider account (e.g., SPRINT®) and may be integrated to the hardware of software of the user's mobile device. Alternately, the proxy financial card may be associated with any service provider that provides services to the user. When the user presents the proxy financial card to initiate a transaction, such as a purchase of goods or services from a point-of-sale terminal ("POS"), information is transmitted from the proxy financial card to the POS (e.g., via NFC) and financial transaction information is passed from the POS to a trusted service manager ("TSM"). The financial transaction information may include information that relates to the user's identification, various aspects of the financial transaction, or the user's financial or mobile accounts. The TSM uses the financial transaction information to determine the identity of the user's service provider and forwards the financial transaction information to the identified service provider.

The service provider maintains a database for each proxy financial card user, and a rule engine accesses the database. The rule engine determines, based on information or rules contained in the database, which of the plurality of accounts with different financial issuers should be used for the present transaction. Rules to determine which financial issuer should be selected for a given transaction (also referred to as a "rule set") may be based on numerous factors, such as spending history, purchase amount, credit card attributes for the financial issuer (e.g., interest rate, account balance), whether the financial issuer is accepted by the merchant, and maximizing rewards across the user's plurality of accounts. The user may fill out a questionnaire, for example during setup or initialization of the user's proxy financial card, to provide information for the database entry for that user. In an embodiment, the user may log into a web based application that promotes defining and/or modifying rules associated with the payment mechanisms associated with that user. The web based application may provide tools to the user for composing rules based on commonly used rules criteria, thereby improving the user experience in defining rules.

When the appropriate financial issuer has been selected, the service provider forwards an indication of the selected financial issuer and the financial transaction information to the TSM via a network. The TSM then forwards the financial transaction information to the selected financial issuer for authorization. Upon authorization, the financial issuer transmits the authorization to the TSM, which then forwards the authorization to the POS. The transaction is then completed in a normal manner when, for example, the selected financial issuer is charged for the transaction and the user signs a credit card receipt.

Alternately, when the appropriate financial issuer has been selected, the service provider forwards the financial transaction information directly to the selected financial issuer for authorization. The financial transaction information may be forwarded to the selected financial issuer via a network that the POS and TSM also access or may be forwarded via a separate back-end network between the service provider and the financial issuer. Upon authorization, the financial issuer transmits the authorization to the service provider. The service provider then forwards the authorization to the TSM, which forwards the authorization to the POS. The transaction is then completed in a normal manner when, for example, the selected financial issuer is charged for the transaction and the user signs a credit card receipt.

In some embodiments, the transaction may be optionally authenticated. For example, an authentication engine may receive the location of the POS where the transaction originated and compare this location against the location of the user's mobile device. The authentication engine may then provide authentication to the selected financial issuer based on a comparison of these locations. Additionally, a rotating PIN may be updated between the proxy financial card and one or more of the TSM, the service provider and the financial issuer following a predetermined number of transactions to add an additional layer of authentication to the proxy financial card's operation. Thus, in accordance with various embodiments, the occurrence of fraud is reduced while the ease of use of conventional credit card accounts is maintained.

In accordance with various embodiments, the service provider cooperates with the TSM to provide transparent operation to both the POS and the financial issuer, both of which may not know of the selection process performed by the service provider. In this way, the service provider is effectively inserted into the TSM transaction stream to assess the transaction (e.g., to select a financial issuer based on user preferences, to authenticate the transaction) and provide additional security against occurrences of fraud.

Now turning to FIG. 1A, a portable electronic device 100 is illustrated. The portable electronic device 100 includes a speaker or earpiece 102, a display 104, a button, set of buttons, or touch-sensitive surface 106 for cursor movement or such on the display 104, another touch-sensitive surface and/or keys 108 for input by a user, and a microphone 110. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. The portable electronic device 100 may further be coupled to a proxy financial card 112 or proxy financial identifier, discussed in more detail later.

In an embodiment, the proxy financial card 112 may be coupled to the exterior of the portable electronic device 100, for example adhered to an external case of the portable electronic device 100. The proxy financial card 112 may comprise near field communication functionality that may interact directly with a point of sale terminal, as described more fully below. Alternatively, the proxy financial card 112 may be carried by a user separately from the portable electronic device 100.

Figure 1B:
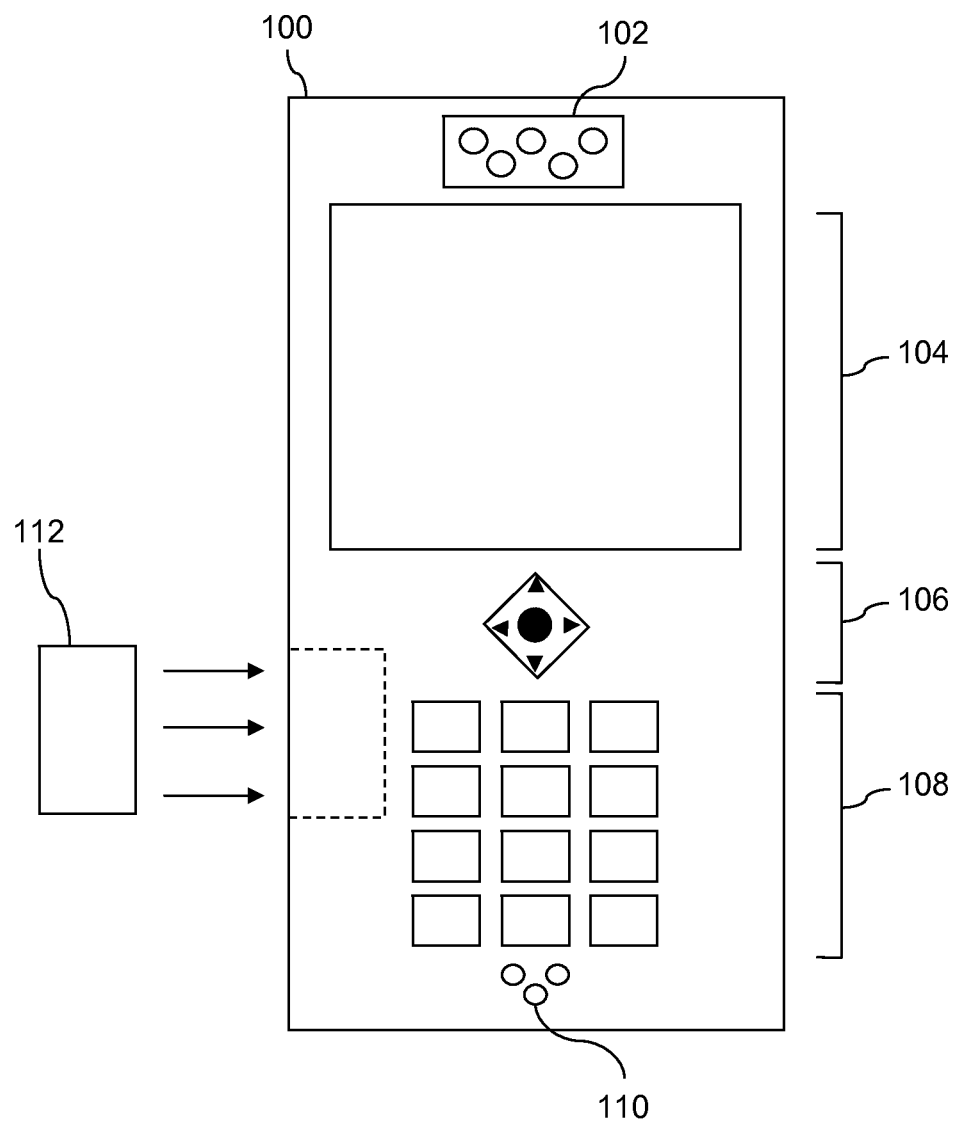
FIG. 1B illustrates a portable electronic device, according to an embodiment of the disclosure.

Turning now to FIG. 1B, an alternative embodiment of the coupling of the proxy financial card 112 with the portable electronic device 100 is described. In an alternative embodiment, the proxy financial card 112 may be inserted into a slot of the portable electronic device 100. For example the proxy financial card 112 may have a connector having pins or contact points that mate with a connector within the receiving slot of the portable electronic device 100. The proxy financial card 112 may be accessed by functionality provided by the portable electronic device 100 that provides a near field communication capability for providing proxy financial payment information retrieved from the proxy financial card 112 to a point of sale terminal, as described more fully below. While the proxy financial card 112 is depicted inserting into a slot in the side of the portable electronic device 100, it is understood the proxy financial card 112 may insert into slots located elsewhere. Additionally, rather than inserting into a slot contained wholly or partially within the perimeter defined by a case of the portable electronic device 100, in an embodiment, a connector of the proxy financial card 112 may plug into a flush-mounted connector on the surface of the portable electronic device 100, and the proxy financial card 112 may remain substantially outside of the perimeter defined by the case of the portable electronic device 100.

Figure 2:
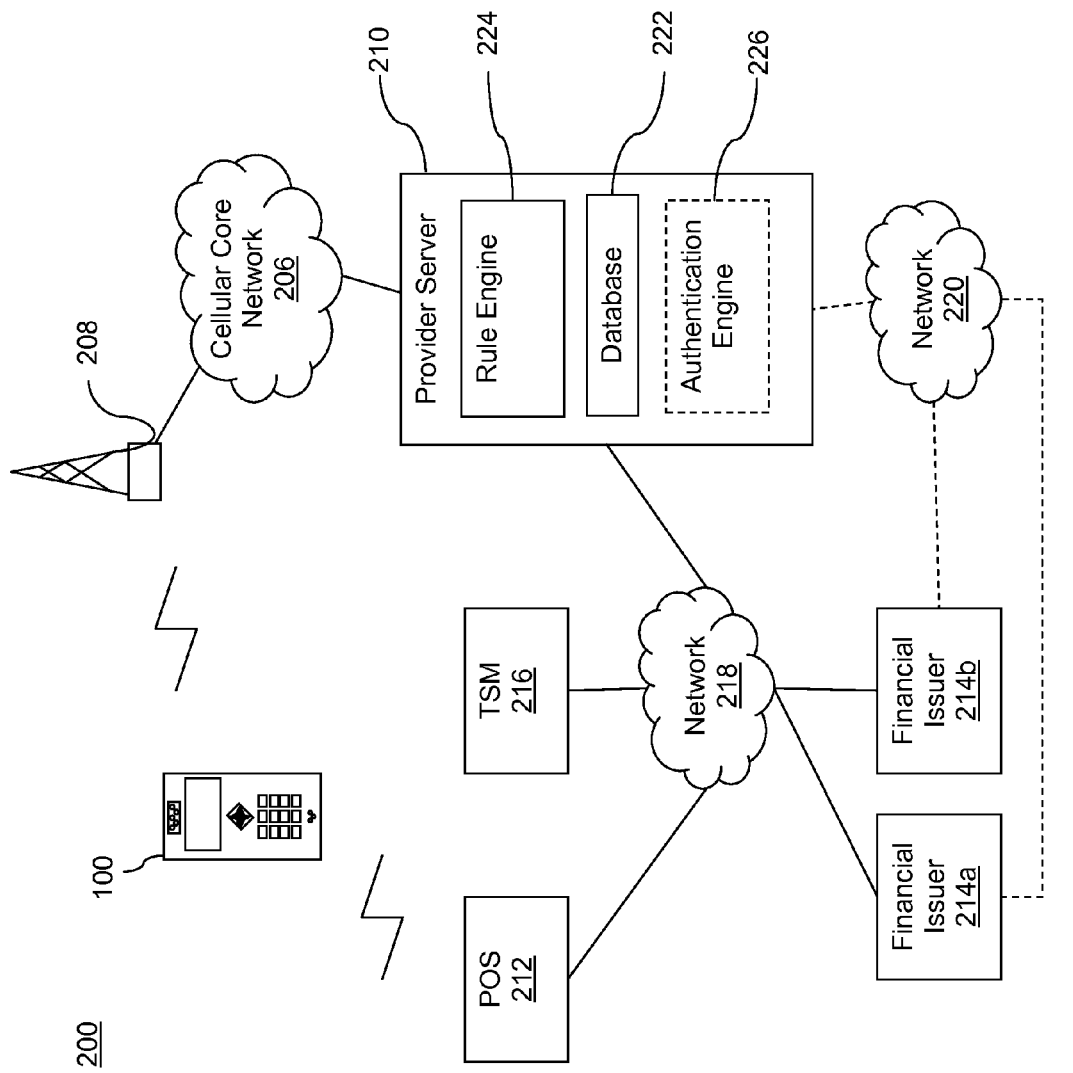
FIG. 2 illustrates a communication system, according to an embodiment of the disclosure.

FIG. 2 illustrates a wireless communication system 200 for facilitating a proxy financial card transaction. The wireless communication system 200 comprises a portable electronic device 100, which may be coupled to a user's proxy financial card 112 as shown in FIG. 1. As explained above, the proxy financial card 112 is similar to a credit card, but is associated with a plurality of the user's accounts with different financial issuers 214a, 214b. The proxy financial card 112 may comprise a small chip or tag that is adhered to a portion of the portable electronic device 100. Alternately, the proxy financial card 112 may comprise a SIM-type chip for insertion and use with the portable electronic device 100. Though illustrated as a mobile phone, the portable electronic device 100 may take various forms including a wireless handset, a pager, a personal digital assistant (PDA), a gaming device, an inventory control device, a media player, a portable computer, a tablet computer, a laptop computer, and/or other. Many suitable handsets combine some or all of these functions. In some embodiments of the present disclosure, the portable electronic device 100 is not a general purpose computing device like a portable, laptop or tablet computer, but rather is a special-purpose communications device such as a mobile phone, wireless handset, pager, or PDA. The portable electronic device 100 may support specialized activities such as gaming, inventory control, job control, and/or task management functions, and so on.

The portable electronic device 100 couples to a cellular core network 206 via a base transceiver station 208. Although one base transceiver station 208 is illustrated, and it should be understood that the wireless communication system 200 may comprise additional base transceiver stations, which may or may not comprise identical hardware, but whose functions may be considered to be the same. The portable electronic device 100 may access the base transceiver station 208 through a peer portable electronic device 100 acting as an intermediary, in a relay type or hop type of connection. In some instances, the portable electronic device 100 may be in communication with multiple base transceiver stations 208 at the same time. The cellular core network 206 may comprise a combination of public and private networks. The cellular core network 206 may comprise both wired communication links and wireless communication links. The cellular core network 206 may comprise, in part, the Internet. Via the link to the cellular core network 206, the base transceiver station 208 may be connected to another system, such as server 210.

The proxy financial card 112 coupled to the portable electronic device 100 may transmit information to a POS 212 using, for example, NFC protocols. In an embodiment where the proxy financial card 112 comprises a SIM-type chip, the proxy financial card 112 may further provide network connectivity for the portable electronic device 100. In this way, the POS 212 may query the proxy financial card 112 for financial transaction information pertaining to a transaction initiated at the POS 212 (e.g., a purchase of goods or services). Financial transaction information may include, for example, identification of the individual that initiated the transaction, an indication of the individual's service provider and an indication of various financial issuers (e.g., financial issuer 214a, 214b) with which the individual maintains accounts. The POS 212 couples to a TSM 216 through a network 218 (e.g., a virtual private network ("VPN"), the Internet). The financial issuer 214a and the server 210 are also coupled to the network 218. Optionally, the server 210 may couple to the financial issuer 214a via a different network 220.

The server 210 may be, for example, a server of the service provider. The server 210 may execute an application 224. The application 224 along with the server 210, may be configured to access a database 222 stored locally on the server 210. The database 222 is maintained by the wireless communications service provider such that there is an entry in the database 222 for each proxy financial card 112 that is associated with a user of the service provider.

The application 224 may comprise a rule engine that determines, based on information contained in the database 222, which of the plurality of accounts with different financial issuers 214a, 214b should be used to provide payment for a transaction initiated at the POS 212. The rule engine 224 may determine which financial issuer 214a, 214b should be selected for a given transaction based on numerous factors, such as the proxy financial card 112 user's spending history, the transaction amount, credit card attributes for the financial issuer 214a (e.g., interest rate, account balance), whether the financial issuer 214a is accepted by the POS 212, and maximizing rewards across the plurality of accounts associated with the user's proxy financial card 112. The user may fill out a questionnaire, for example during setup or initialization of the user's proxy financial card 112, to provide information for the database entry for that user.

The application 224 may also comprise an authentication engine that receives the location of the POS 212 where the transaction originated and compares this location against the location of the user's mobile device 100. The authentication engine may then provide authentication to the selected financial issuer based on a comparison of these locations. Alternatively, an authentication engine 226 may be a separate application or a component executing on the server 210. Alternately, the authentication engine may reside at the TSM 216.

In an embodiment, a user of the portable electronic device 100 (also referred to as a customer of a service provider, or merely as a customer) may present their portable electronic device 100 and proxy financial card 112 at the POS 212 to initiate a transaction, such as a purchase of goods or services. The POS 212 may query the proxy financial card 112 (e.g., via NFC) for financial transaction information, such as information that relates to the user's identification, various aspects of the financial transaction, or the user's financial or mobile accounts. The POS 212 forwards the financial transaction information to the TSM 216, which uses the financial transaction information to identify the customer's service provider and forwards the financial transaction information to the identified service provider (e.g., server 210). This transfer of information may occur over, for example, the network 218.

In an embodiment, the service provider maintains a database 222 that contains an entry for each customer's proxy financial card 112. An application, such as the rule engine 224, is executed by a server 210 operated by the service provider and accesses the database 222. The database 222 may be accessed through, for example, the cellular core network 206 or the database 222 may be stored on the server 210. The rule engine 224 determines, based on information or rules contained in the database 222 entry for the customer's proxy financial card 112, which of the plurality of accounts with different financial issuers should be used for the present transaction. By allowing the customer to participate in generating the rules that determine which financial issuer is used for a given transaction, the customer is able to maximize reward benefits across multiple accounts, minimize incurred fees (e.g., for exceeding a credit limit, minimizing interest charged per month), and more generally, customize their spending decisions to suit their needs.

In an embodiment, when the appropriate financial issuer has been selected, the server 210 of the service provider forwards an indication of the selected financial issuer 214a and the financial transaction information to the TSM 216 via the network 218. The TSM 216 then forwards the financial transaction information to the selected financial issuer 214a, via the network 218, for authorization. Upon authorization, the financial issuer 214a transmits the authorization to the TSM 216 via the network 218 and the TSM 216 then forwards the authorization to the POS 212, also via the network 218. The transaction is then completed in a normal manner when, for example, the selected financial issuer is charged for the transaction and the user signs a credit card receipt.

In an alternate embodiment, when the appropriate financial issuer has been selected, the server 210 of the service provider forwards the financial transaction information directly to the selected financial issuer 214a for authorization. The forwarding of financial transaction may occur via the network 218 or a separate back-end network 220. Upon authorization, the financial issuer 214a transmits the authorization to the server 210 of the service provider via the network 218 or the back-end network 220. The server 210 of the service provider then forwards the authorization to the TSM 216 via the network 218. The TSM 216 forwards the authorization to the POS 212 via the network 218. The transaction is then completed in a normal manner when, for example, the selected financial issuer 214a is charged for the transaction and the user signs a credit card receipt.

In an embodiment, an authentication engine of the server 210 of the service provider or the TSM 216 performs additional authentication of the transaction. The authentication may be performed before the financial transaction information is forwarded to the financial issuer 214a for authorization or, optionally, after authorization has been granted by the financial issuer 214a. If the authentication is performed before the financial transaction information is forwarded and the authentication fails, the transaction may be rejected and information indicating the rejection may be forwarded to the POS 212 via the network 218. If the authentication is performed after authorization has been granted and the authentication fails, the authorization may be revoked and this information forwarded to the POS 212 via the network 218.

Authentication of the transaction may occur in various ways. In one embodiment, the server 210 compares the location of the POS 212 where the proxy financial card 112 is presented with the location of the portable electronic device 100. The location of the portable electronic device 100 may be determined by, for example, the use of Global Positioning System ("GPS") data transmitted to the server 210 through the cellular core network 206. The location of the portable electronic device 100 may also be determined by, for example, triangulation of the portable electronic device 100 relative to a plurality of base transceiver stations 208. If the location of the portable electronic device 100 is not the same as the location of the POS 212 where the transaction originated, authentication of the transaction may fail. This makes it more difficult for the proxy financial card 112 to be used by a person other than the owner of the portable electronic device 100, which ultimately reduces the financial issuer's 214a losses due to fraud.

In another embodiment, a rotating PIN may be updated following a prior transaction to add an additional layer of authentication to the proxy financial card's operation. The rotating PIN may be updated by communication between the proxy financial card 112 and the TSM 216, the server 210 of the service provider, or the financial issuer 214a, where the new PIN is agreed upon, for example, using a handshake procedure. The rotating PIN may be updated when a predetermined number of transactions have occurred since the previous rotating PIN update. The addition of a rotating PIN makes the proxy financial card 112 harder to emulate because the knowledge of the account number alone is not sufficient to complete a transaction. Thus, requiring the correct rotating PIN to authenticate a transaction further reduces the financial issuer's 214a losses due to fraud. By reducing the exposure of the financial issuer 214a to losses due to fraud, the TSM 216 and the service provider present the financial issuer 214a with a compelling business case to share the savings afforded the financial issuer 214a with either or both of the TSM 216 and the service provider.

In an embodiment, the server 210 promotes a method for storing and accessing financial payment information that facilitates and/or participates in completion of a payment transaction at the POS 212. For example, the database 222, the rule engine 224, and optionally the authentication engine 226 collaborate to promote a user defining payment rules as described above and completing a credit card payment transaction. The method may comprise receiving from a user and storing in the database 222 payment card information and rules. For example, the user may provide identification of card numbers and card authentication codes for storing in the database 222. Further, the user may define one or more rules for selecting between the several defined payment cards. The user may be assisted or supported in these actions by a web based application that executes on the server 210.

The method may include the service provider supplying the proxy financial card 112 to the user, for example mailing the proxy financial card 112 to the user or providing the proxy financial card 112 to the user at a retail store outlet associated with the service provider. The user may store the proxy financial card 112 in a wallet like a credit card or a debit card. Alternatively, the user may adhere the proxy financial card 112 to a portable electronic device 100 or plug the proxy financial card 112 into a slot of connector of the portable electronic device 100. The proxy financial card 112, as described further above, may provide a way to identify the user and to identify the server 210 to the POS 212 during payment transactions.

The method may include receiving from the POS 212 information obtained by the POS 212 from the proxy financial card 112 presented during the course of a payment transaction. The information may identify the user and/or identify the proxy financial card 112. The information may further carry information about the in-progress payment transaction, for instance an amount of the transaction and a description of the item or category of item being paid for. The method includes processing the identity information and the transaction information to select a payment mechanism. For example, the rule engine 224 identifies a set of rules associated with the proxy financial card 112, executes the rules in the context of the transaction information, and selects a specific credit card to be used for payment. In an embodiment, the authentication engine 226 may be called upon to provide various authentication actions before continuing the method.

The server 210 and/or rule engine 224 sends information associated with the selected credit card to the POS 212. The POS 212 may then complete the payment transaction with the financial issuer 214 associated with the selected credit card or other payment card.

Figure 3:
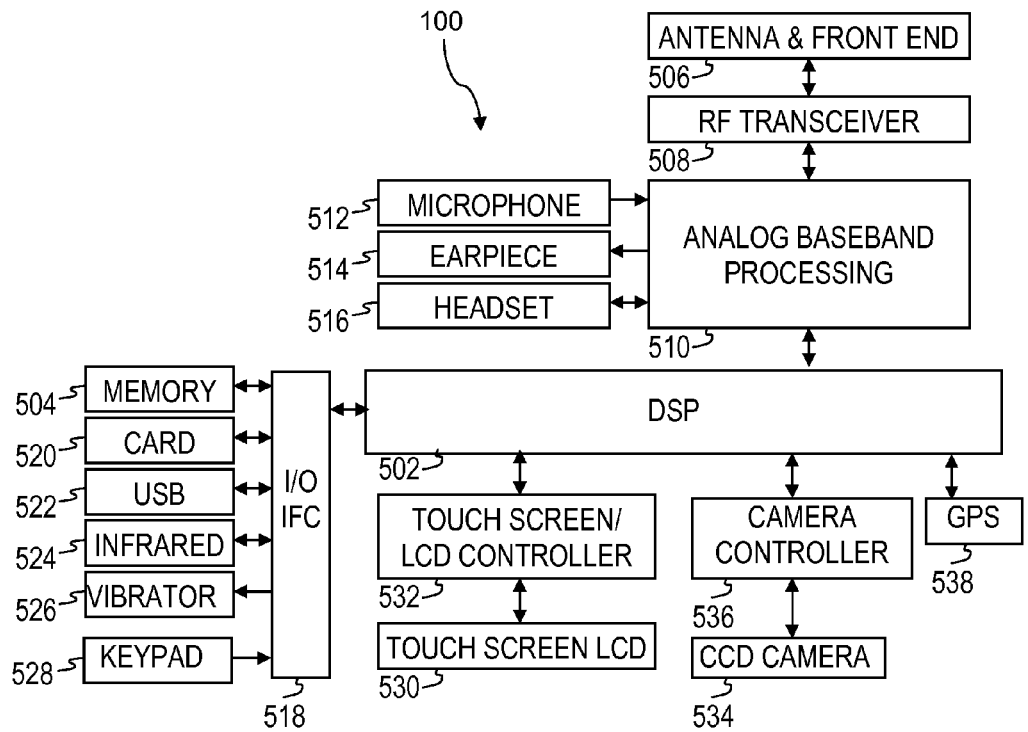
FIG. 3 is a block diagram of a portable electronic device, according to an embodiment of the disclosure.

FIG. 3 shows a block diagram of the portable electronic device 100. While a variety of known components of portable electronic devices 100 are depicted, in an embodiment a subset of the listed components and/or additional components not listed may be included in the portable electronic device 100. The portable electronic device 100 includes a digital signal processor (DSP) 502 and a memory 504. As shown, the portable electronic device 100 may further include an antenna and front end unit 506, a radio frequency (RF) transceiver 508, an analog baseband processing unit 510, a microphone 512, an earpiece 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 100 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 100 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 100 to send and receive information from a radio access network (RAN) or some other available wireless communications network or from a peer portable electronic device 100. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 100 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 100 to function as a peripheral device to exchange information with a personal computer or other computer system. The infrared port 524 and other optional ports such as a BLUETOOTH interface or an IEEE 802.11 compliant wireless interface may enable the portable electronic device 100 to communicate wirelessly with other nearby handsets and/or wireless base stations.

The input/output interface 518 may further connect the DSP 502 to the vibrator 526 that, when triggered, causes the portable electronic device 100 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 100. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 100 to take digital pictures. The DSP 502 communicates with the CCD camera 534 via the camera controller 536. The GPS sensor 538 is coupled to the DSP 502 to decode global positioning system signals, thereby enabling the portable electronic device 100 to determine its position. In another embodiment, a camera operating according to a technology other than charge coupled device cameras may be employed. Various other peripherals may also be included to provide additional functions, e.g., radio and television reception.

Figure 4:
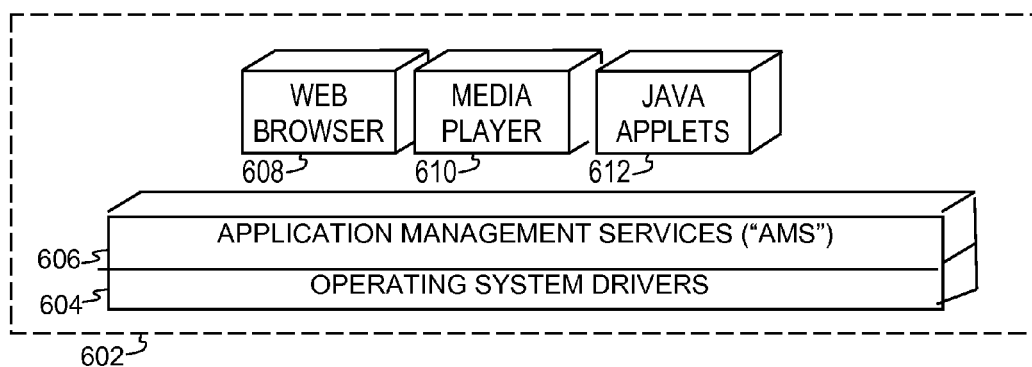
FIG. 4 is a block diagram of software architecture of a portable electronic device, according to an embodiment of the disclosure.

FIG. 4 illustrates a software environment 602 that may be implemented by the DSP 502. The DSP 502 executes operating system software that provides a platform from which the rest of the software operates. The operating system software 604 may provide a variety of operating system drivers 604 for the handset hardware with standardized interfaces that are accessible to application software. The operating system software may be coupled to and interact with application management services ("AMS") 606 that transfer control between applications running on the portable electronic device 100. Also shown in FIG. 4 are a web browser application 608, a media player application 610, and JAVA applets 612. The web browser application 608 configures the portable electronic device 100 to operate as a web browser, allowing a user to enter information into forms and select links to retrieve and view web pages. The media player application 610 configures the portable electronic device 100 to retrieve and play audio or audiovisual media. The JAVA applets 612 configure the portable electronic device 100 to provide games, utilities, and other functionality.

Figure 5:
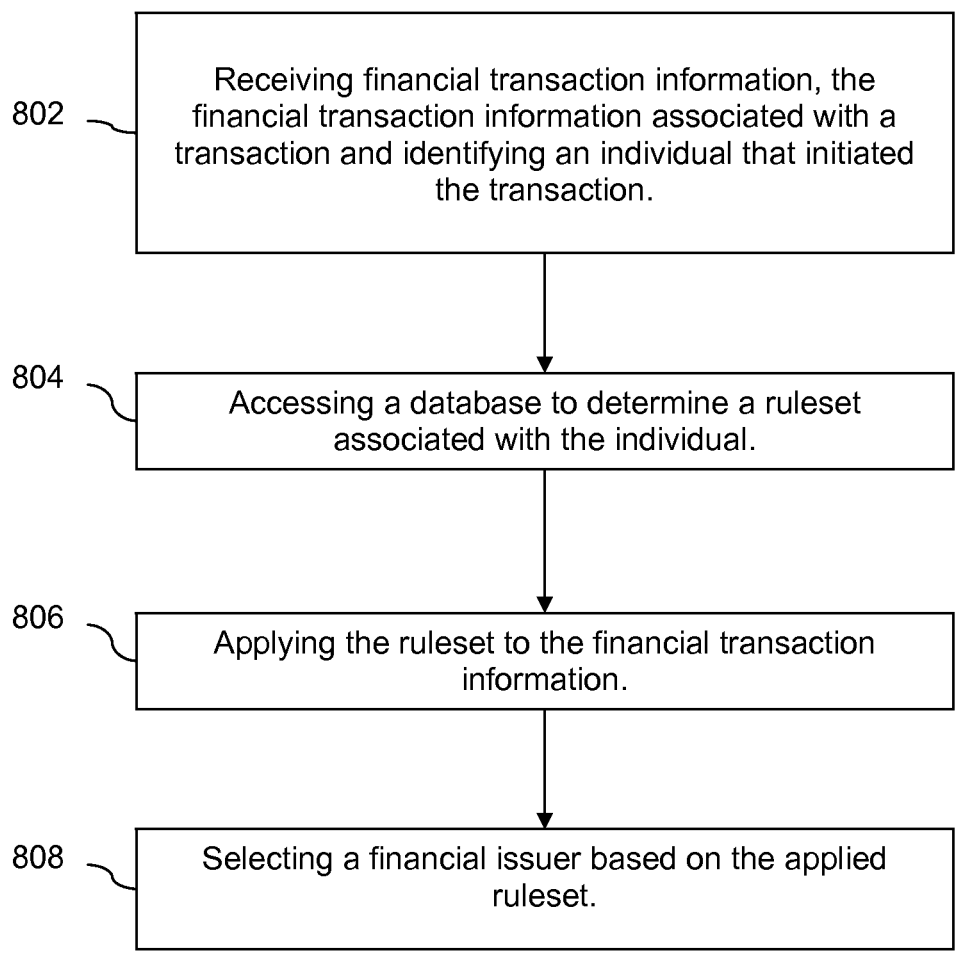
FIG. 5 is a flowchart, according to an embodiment of the disclosure.

FIG. 5 illustrates a flowchart 800 of the embodiment of the disclosure. In step 802, financial transaction information that is associated with a transaction (e.g., a purchase of goods or services initiated at the POS 212) and identifies an individual that initiated the transaction is received, for example by the rule engine 224 of the server 210 of the service provider. The financial transaction information may be received from the TSM 216 through the network 218. The rule engine 224 causes the server 210 to access the database 222 to determine a rule set associated with the individual in step 804. When a rule set has been determined, the rule engine 224 applies the rule set to the financial information in step 806. A financial issuer 214*a* is selected based on the applied rule set in step 808. The transaction may then continue in an appropriate manner as described previously herein. For example, in some embodiments, an authentication engine 226 may receive the location of the POS 212 where the transaction originated and compare this location against the location of the user's personal electronic device 100. The authentication engine 226 may then provide authentication to the selected financial issuer based on a comparison of these locations.

Figure 6:
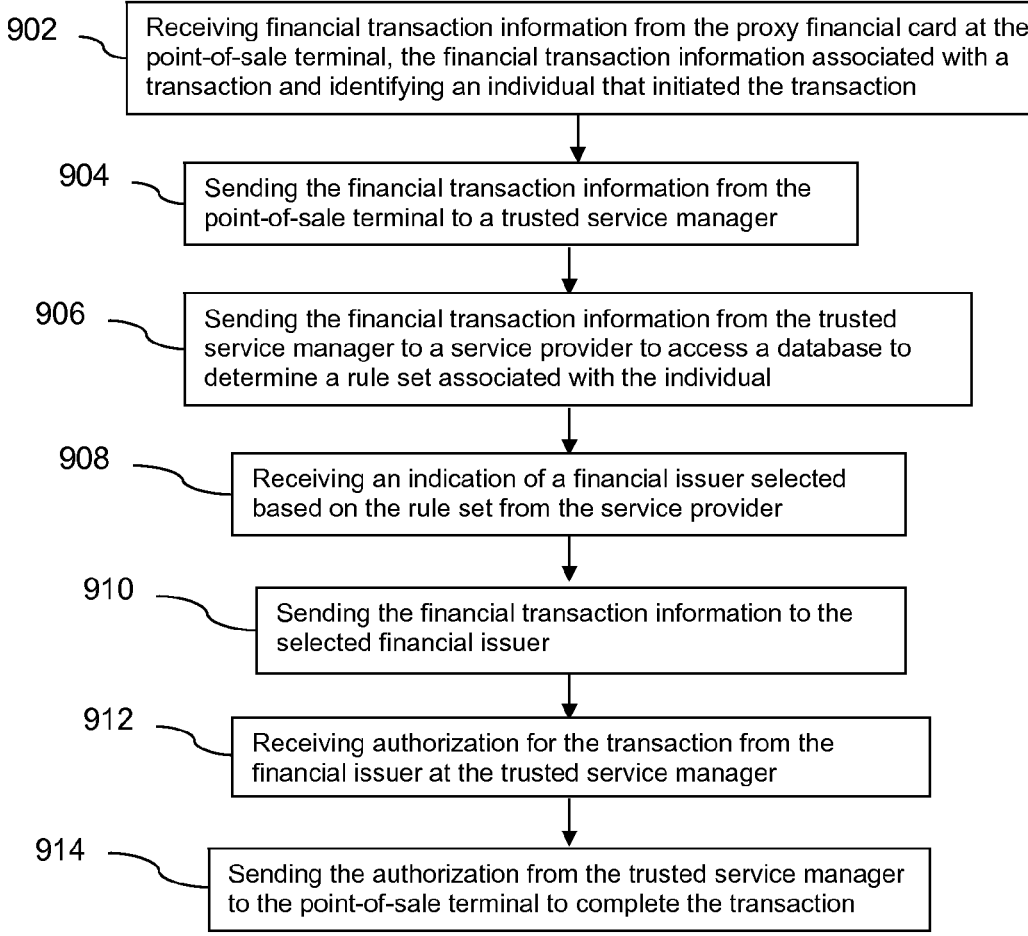
FIG. 6 is a flowchart, according to an embodiment of the disclosure.

FIG. 6 illustrates a flowchart 900 of an embodiment of the present disclosure. In step 902, a POS 212 receives financial transaction information from a proxy financial card. The financial transaction information is associated with a transaction (e.g., a purchase of goods or services) and identifies an individual initiating the transaction. In step 904, the POS 212 sends the financial transaction information to the TSM 216. In step 906, the TSM 216 sends the financial transaction information to a service provider (e.g., server 210) to access a database (e.g., database 222) to determine a rule set associated with the individual. In step 908, the TSM 216 receives an indication of a financial issuer 214 selected based on the rule set from the service provider. Then, in step 910, the TSM 216 sends the financial transaction information to the selected financial issuer 214*a*. In step 912, the TSM 216 receives authorization for the transaction. The authorization may be alternatively received by the rule engine 224 or server 210 of the service provider. In step 914, the authorization is forwarded to the POS 212 to complete the transaction. The TSM 216 may forward the authorization directly to the POS 212 or act as a conduit for the rule engine 224 or server 210 of the service provider to forward the authorization to the POS 212.

Figure 7:
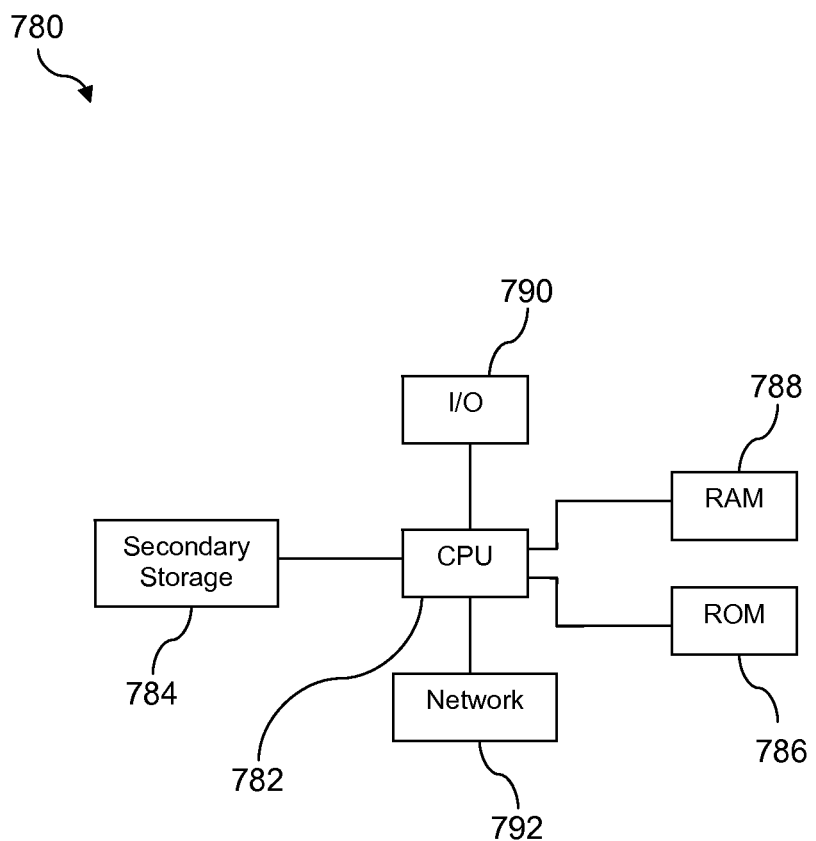
FIG. 7 illustrates an exemplary computer system, according to an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing a financial transaction after a point-of-sale terminal initiates a payment request and sends financial transaction information, comprising:
    receiving, by a processor, the financial transaction information from a point-of-sale terminal, wherein the financial transaction information is associated with the financial transaction, and wherein the financial transaction information comprises at least one of user identification information or proxy financial card identification information obtained from a proxy financial card;
    accessing, by a processor, a database to determine a rule set associated with the at least one of the user identification information or the proxy financial card identification information, wherein the rule set defines one or more rules for selecting between a plurality of financial issuers;
    applying, by a processor, the rule set to the financial transaction information; and
    selecting, by a processor, a financial issuer from the plurality of financial issuers based on applying the rule set.

2. The method of claim 1 wherein the financial transaction information comprises a location of the financial transaction or a currency value of the financial transaction.

3. The method of claim 2 further comprising purchasing a good or a service; wherein the financial transaction information further comprises an identifier of a class of the good or the service and the currency value comprises a price of the good or the service.

4. The method of claim 1 further comprising initiating the financial transaction by a portable electronic device associated the proxy financial card.

5. The method of claim 4 wherein the portable electronic device comprises the proxy financial card, the proxy financial card associated with the plurality of financial issuers, and initiating further comprises presenting, by the portable electronic device, the proxy financial card to the point-of-sale terminal.

6. The method of claim 1 wherein the rule set comprises at least one rule defined by an individual user of the proxy financial card.

7. The method of claim 1 further comprising authenticating, by a processor, the financial transaction by:
    comparing a location of the financial transaction and a location of a portable electronic device associated with the proxy financial card; and
    denying authentication if the location of the transaction is different than the location of the portable electronic device.

8. The method of claim 1 further comprising authenticating, by a processor, the financial transaction by comparing a rotating personal identification number received from a portable electronic device associated with the proxy financial card with a rotating personal identification number value stored in the database, wherein the rotating personal identification number value stored in the database was agreed upon in a previous transaction between the portable electronic device and a computer that accesses the database.

9. The method of claim 1 further comprising:
    receiving from an individual, and storing in the database at a server, the rule set and account information for the plurality of financial issuers; and
    providing the proxy financial card to the individual, the proxy financial card to enable the server to identify the individual.

10. The method of claim 1 further comprising:
    sending, by a processor, an indication of the selected financial issuer to the point-of-sale terminal or a trusted service manager;
    wherein the point-of-sale terminal or the trusted service manager contacts the selected financial issuer to obtain authorization to complete the financial transaction.

11. A method of completing a financial transaction at a point of sale terminal in which a proxy financial card is used to access credit card information stored on a network server, comprising:
    receiving, by the point-of-sale terminal, identification information comprising at least one of user identification information or proxy financial card identification information from the proxy financial card;
    sending, by the point-of-sale terminal, financial transaction information to a trusted service manager, wherein the financial transaction information is associated with the financial transaction, and wherein the financial transaction information comprises the at least one of the user identification information or the proxy financial card identification information from the proxy financial card;
    sending, by the trusted service manager, the financial transaction information to a service provider to access a database to determine a rule set associated with the at least one of the user identification information or the proxy financial card identification information, wherein the rule set defines one or more rules for selecting between a plurality of financial issuers;

receiving, by the trusted service manager, an indication of a financial issuer of the plurality of financial issuers selected based on the rule set from the service provider;

sending, by the trusted service manager, the financial transaction information to the selected financial issuer;

receiving, by the trusted service manager, authorization for the financial transaction from the financial issuer; and sending, by the trusted service manager, the authorization to the point-of-sale terminal to complete the financial transaction.

12. The method of claim 11 wherein the financial transaction information comprises a location of origin of the financial transaction or a currency value of the financial transaction.

13. The method of claim 12 wherein the financial transaction comprises a purchase transaction for a good or a service, and wherein the financial transaction information further comprises an identifier of a class of the good or the service and the currency value comprises a price of the good or the service.

14. The method of claim 11 further comprising initiating the transaction by a portable electronic device associated with the proxy financial card.

15. The method of claim 14 wherein the portable electronic device comprises the proxy financial card, the proxy financial card associated with the plurality of financial issuers, and initiating further comprises presenting the proxy financial card to a reader at the point-of-sale terminal.

16. The method of claim 11 wherein the rule set comprises at least one rule defined by an individual user of the proxy financial card.

17. The method of claim 11 further comprising authenticating, by the service provider, the financial transaction, wherein the financial transaction is initiated by a portable electronic device associated with the proxy financial card and authenticating further comprises:

comparing, by the service provider, a location of the financial transaction and a location of the portable electronic device; and denying authentication, by the service provider, if the location of the financial transaction is different than the location of the portable electronic device.

18. The method of claim 11 further comprising authenticating, by the service provider, the financial transaction, wherein authenticating further comprises comparing, by the service provider, a rotating personal identification number received from a portable electronic device associated with the proxy financial card with a rotating personal identification number value stored in the database, and wherein the rotating personal identification number value stored in the database was agreed upon in a previous transaction between the portable electronic device and a computer that accesses the database.

19. A system for completing an electronic financial transaction after a point-of-sale terminal initiates a payment request by sending financial transaction information, comprising:

a processor configured to execute a rule engine;
a database; and
a processor configured to execute an authentication engine;
wherein the rule engine is configured to:
receive financial transaction information, wherein the financial transaction information is associated with the electronic financial transaction, and wherein the financial transaction information comprises at least one of user identification information or proxy financial card identification information obtained from a proxy financial card;

access the database to determine a rule set associated with the at least one of the user identification information or the proxy financial card identification information, wherein the rule set includes at least one rule defined by an individual user of the proxy financial card, and wherein the rule set defines one or more rules for selecting between a plurality of financial issuers;

apply, the rule set to the financial transaction information; and select, a financial issuer from the plurality of financial issuers based on applying the rule set; and wherein the authentication engine is configured to:
receive information about the location of the point-of-sale terminal;
receive information about the location of a portable electronic device associated with the proxy financial card;
compare the location of the point-of-sale terminal to the location of the portable electronic device associated with the proxy financial card; and
provide authentication based on the comparison of locations to the financial issuer selected by the rule engine.

20. The system of claim 19 wherein the portable electronic device associated with the proxy financial card is configured to initiate the electronic financial transaction.

* * * * *